(12) United States Patent
Hyun et al.

(10) Patent No.: US 9,924,007 B2
(45) Date of Patent: Mar. 20, 2018

(54) MOBILE TERMINAL

(71) Applicant: LG ELECTRONICS INC., Seoul (KR)

(72) Inventors: Youngjin Hyun, Seoul (KR); Kidong Kim, Seoul (KR); Sungmin Kim, Seoul (KR); Sanghun An, Seoul (KR); Jaehoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/903,969

(22) PCT Filed: Feb. 11, 2014

(86) PCT No.: PCT/KR2014/001127
§ 371 (c)(1),
(2) Date: Jan. 8, 2016

(87) PCT Pub. No.: WO2015/005558
PCT Pub. Date: Jan. 15, 2015

(65) Prior Publication Data
US 2016/0173673 A1    Jun. 16, 2016

(30) Foreign Application Priority Data

Jul. 8, 2013  (KR) .................. 10-2013-0079893
Jul. 8, 2013  (KR) .................. 10-2013-0079894

(51) Int. Cl.
*H04B 1/3888* (2015.01)
*H04M 1/23* (2006.01)
*H04M 1/02* (2006.01)

(52) U.S. Cl.
CPC .......... *H04M 1/236* (2013.01); *H04B 1/3888* (2013.01); *H04M 1/0262* (2013.01);
(Continued)

(58) Field of Classification Search
CPC .. H04M 1/236; H04M 1/0277; H04M 1/0262; H04M 1/0266; H04B 1/3888; H01H 2215/004
See application file for complete search history.

(56) References Cited

U.S. PATENT DOCUMENTS

2003/0211835 A1* 11/2003 Pan .................. H04M 1/0249
                                                                    455/90.3
2006/0131157 A1*  6/2006 Chadha ............... H01H 13/807
                                                                    200/512
(Continued)

FOREIGN PATENT DOCUMENTS

CN        101071341        11/2007
CN        101925971        12/2010
(Continued)

OTHER PUBLICATIONS

State Intellectual Property Office of the People's Republic of China Application Serial No. 201480038675.3, Office Action dated Apr. 28, 2017, 17 pages.

(Continued)

*Primary Examiner* — Kamran Afshar
*Assistant Examiner* — Minjung Kim
(74) *Attorney, Agent, or Firm* — Lee, Hong, Degerman, Kang & Waimey

(57) ABSTRACT

Disclosed is a mobile terminal having a rear input unit disposed on a rear surface of a display unit, and configured to receive a control command by a push input. Especially, the present invention provides a structure capable of preventing a force rather than a user's pressing force from being applied to the rear input unit, and a structure capable of shielding an operation sound generated when a pressing force is applied to the rear input unit.

8 Claims, 10 Drawing Sheets

(52) U.S. Cl.
CPC ....... *H04M 1/0266* (2013.01); *H04M 1/0277* (2013.01); *H01H 2215/004* (2013.01)

(56) References Cited

U.S. PATENT DOCUMENTS

| | | | | |
|---|---|---|---|---|
| 2006/0166083 A1* | 7/2006 | Zhang | ................ | H01M 2/1066 429/97 |
| 2007/0262954 A1* | 11/2007 | Na | ................ | G06F 3/0338 345/156 |
| 2010/0156648 A1* | 6/2010 | Dosaka | ................ | G08B 25/003 340/635 |
| 2011/0228494 A1* | 9/2011 | Xiao | ................ | H01H 13/705 361/752 |
| 2011/0237313 A1* | 9/2011 | Takita | ................ | H04M 1/0237 455/575.4 |
| 2011/0278146 A1* | 11/2011 | Zheng | ................ | H01H 13/705 200/5 A |
| 2013/0069883 A1* | 3/2013 | Oga | ................ | G06F 1/1615 345/172 |

FOREIGN PATENT DOCUMENTS

| | | |
|---|---|---|
| CN | 202013532 | 10/2011 |
| CN | 103003770 | 3/2013 |
| EP | 2416544 | 2/2012 |
| KR | 10-2005-0113061 | 12/2005 |
| KR | 10-2011-0112911 | 10/2011 |
| KR | 10-2011-0113243 | 10/2011 |
| KR | 1020110112911 | 10/2011 |
| KR | 20-2013-0000786 | 2/2013 |
| TW | 544029 | 7/2003 |

OTHER PUBLICATIONS

European Patent Office Application Serial No. 14823770.4, Search Report dated Mar. 22, 2017, 10 pages.
PCT International Application No. PCT/KR2014/001127, Written Opinion of the International Searching Authority dated May 13, 2014, 1 page.
The State Intellectual Property Office of the People's Republic of China Application Serial No. 201480038675.3, Office Action dated Oct. 26, 2017, 19 pages.

\* cited by examiner

[Fig. 1]
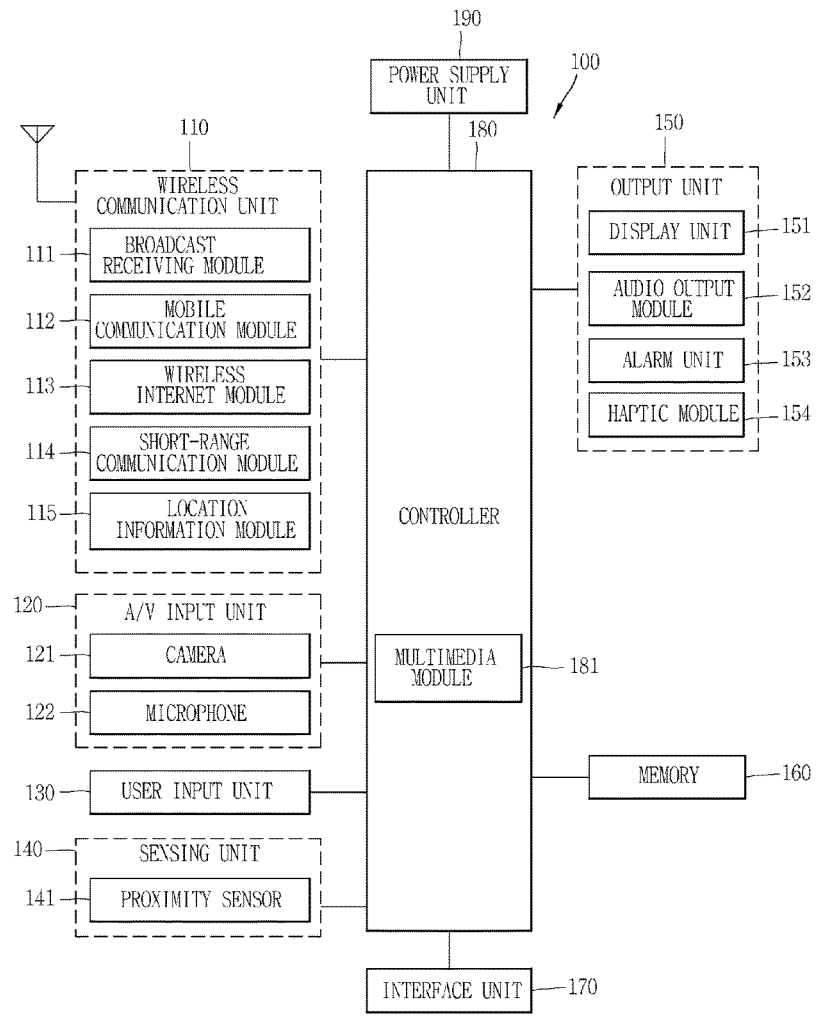
[Fig. 2A]
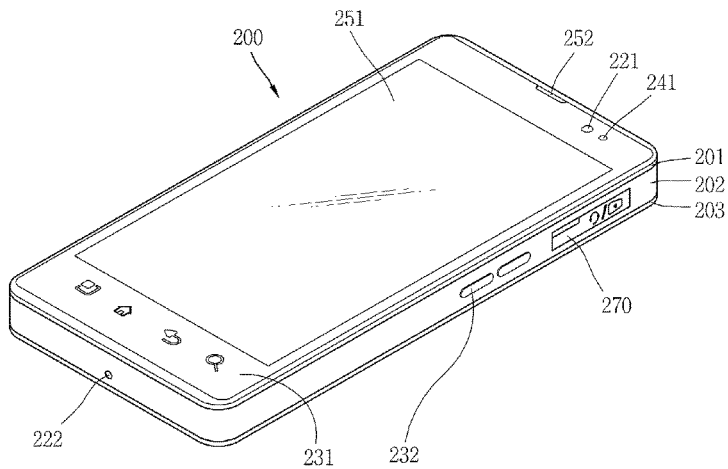

[Fig. 2B]
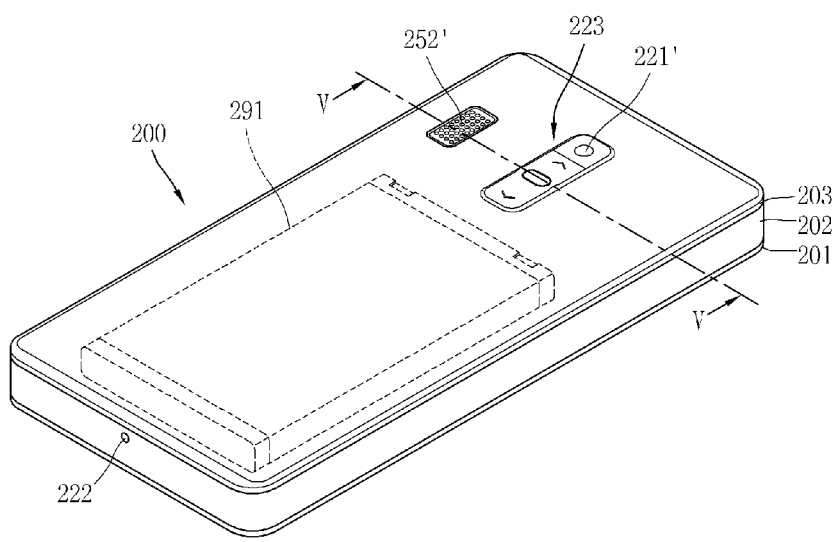

[Fig. 3]
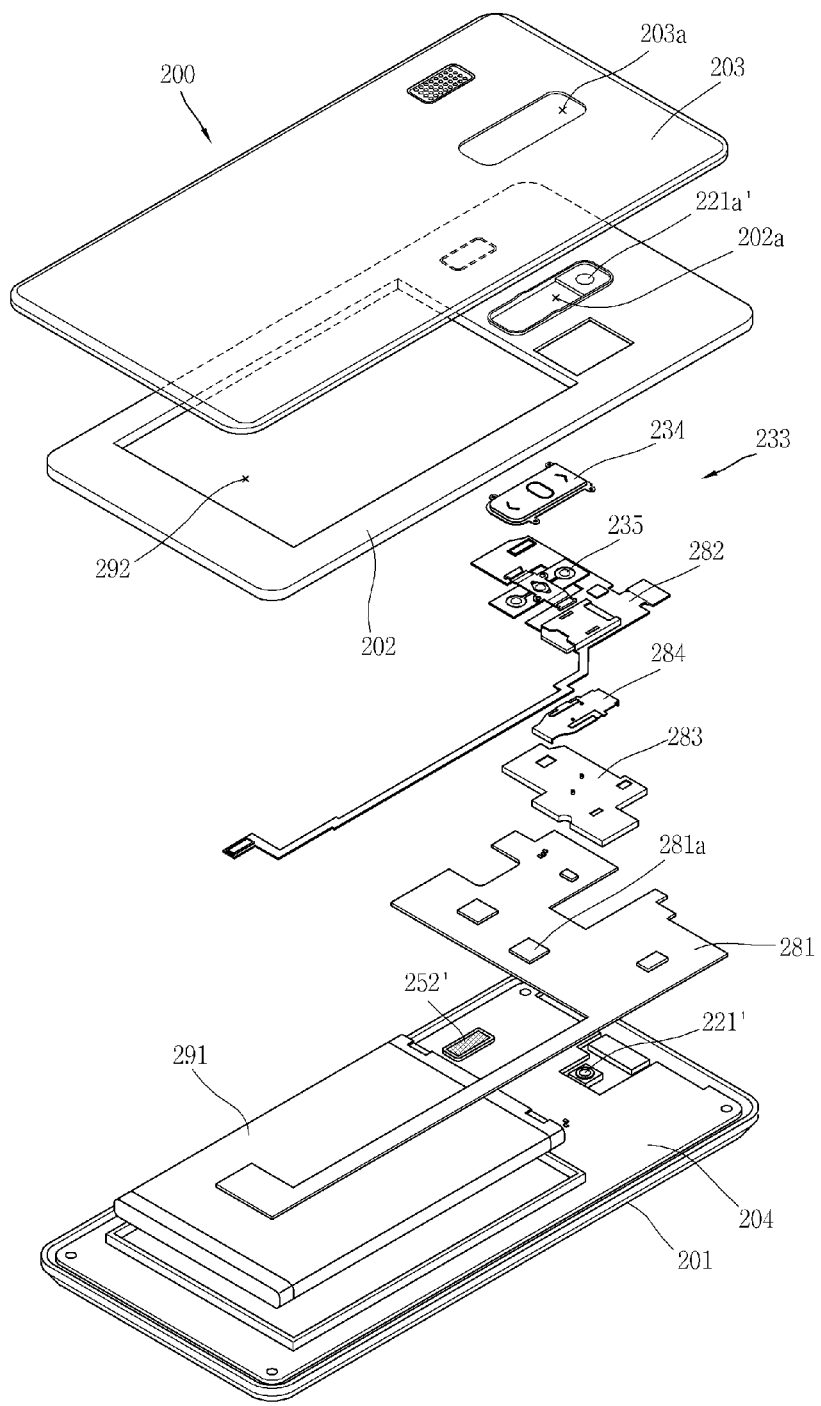

[Fig. 4]
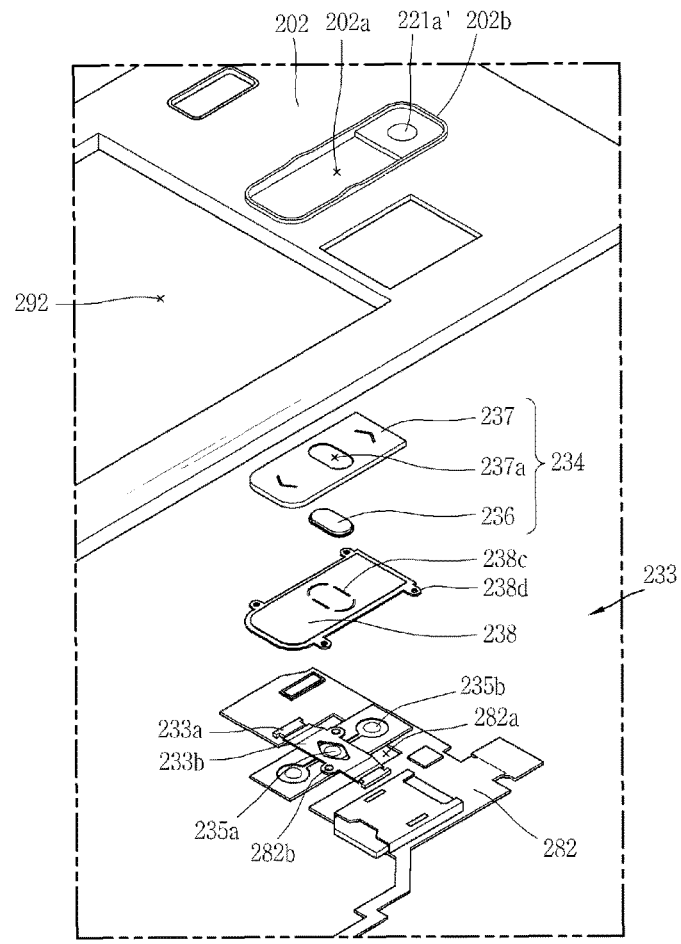
[Fig. 5]
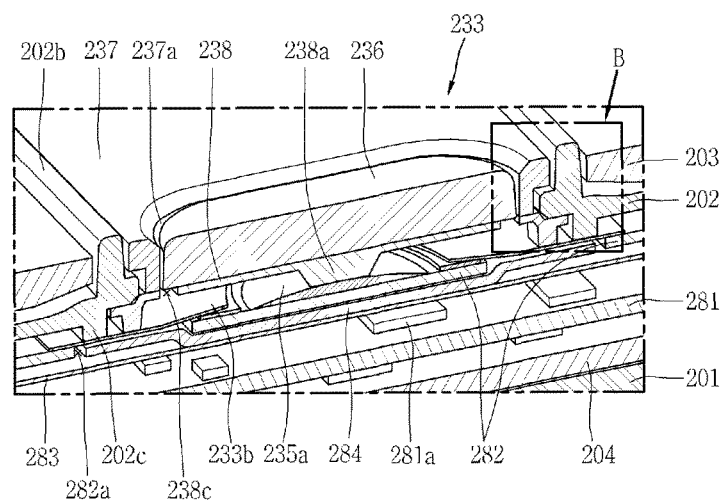

[Fig. 6]
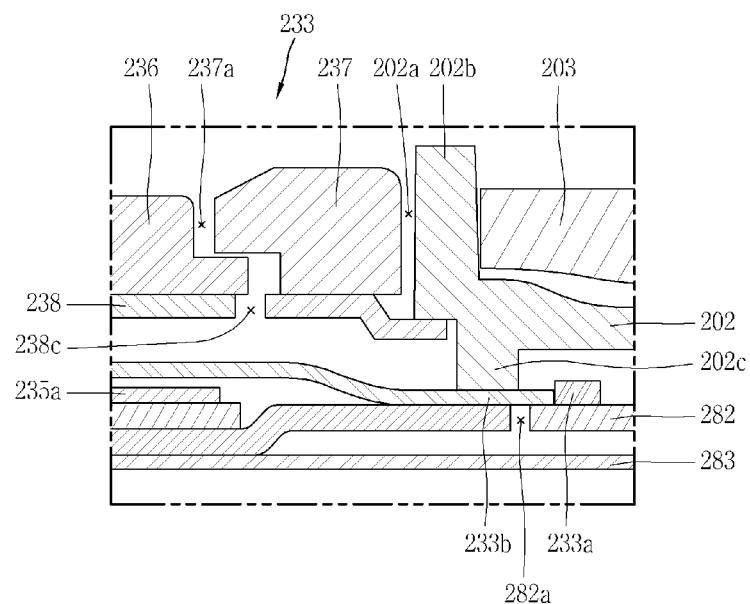
[Fig. 7]
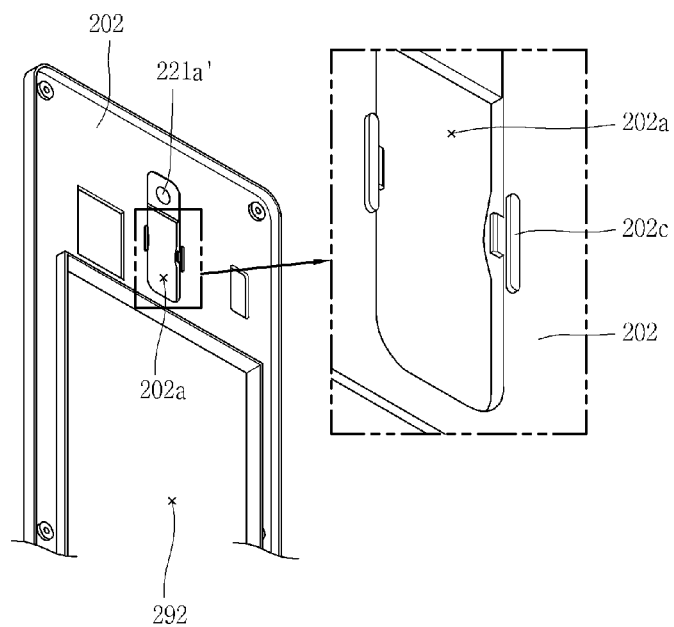

[Fig. 8]
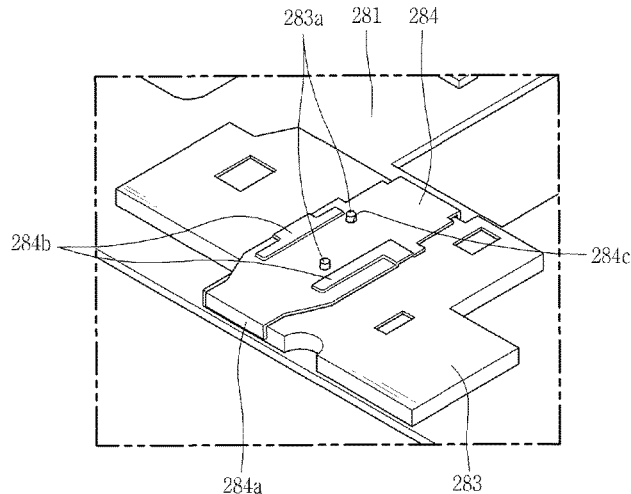
[Fig. 9]
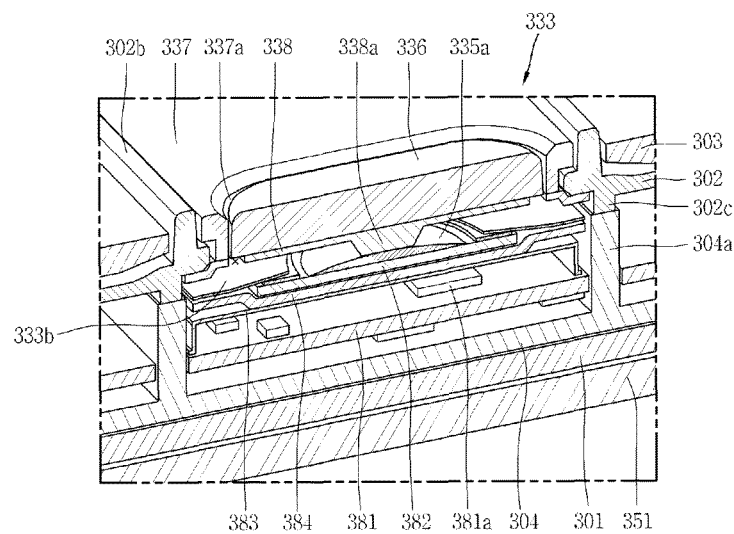
[Fig. 10]
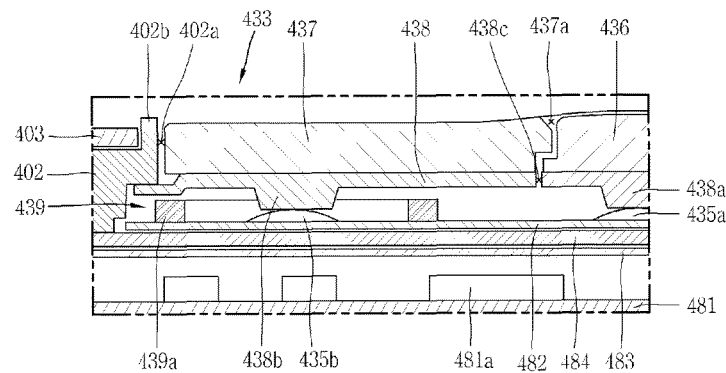

[Fig. 11]
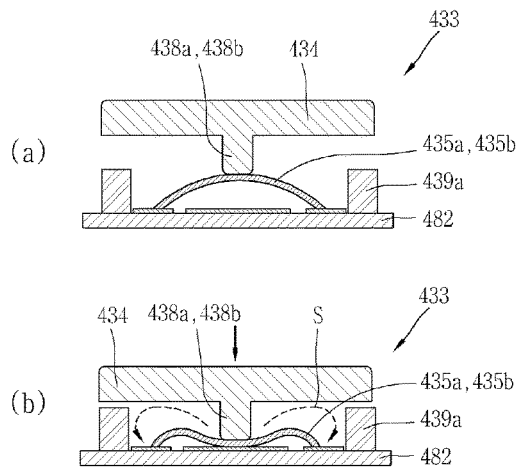
[Fig. 12]
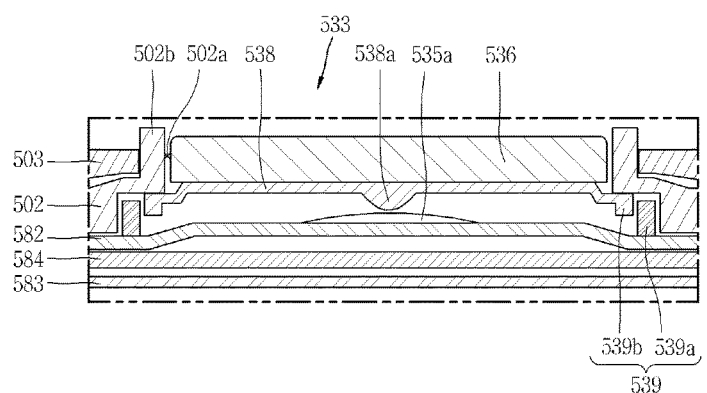
[Fig. 13]
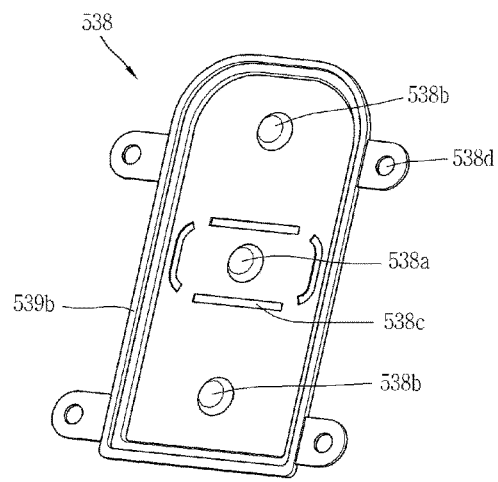

[Fig. 14]
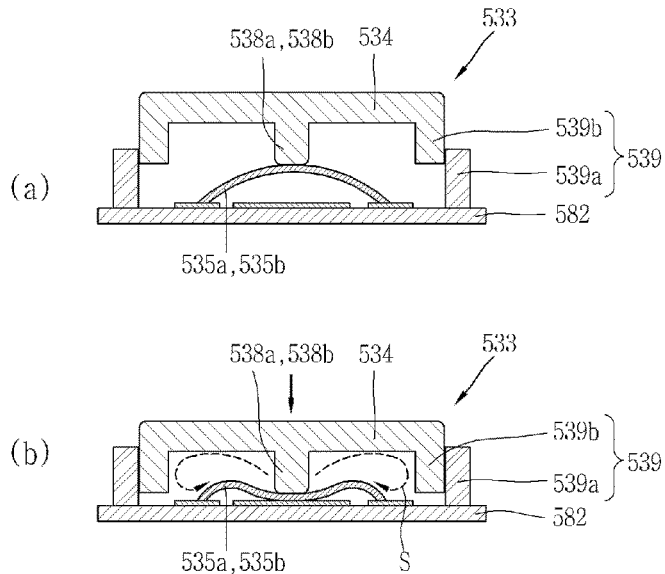
[Fig. 15]
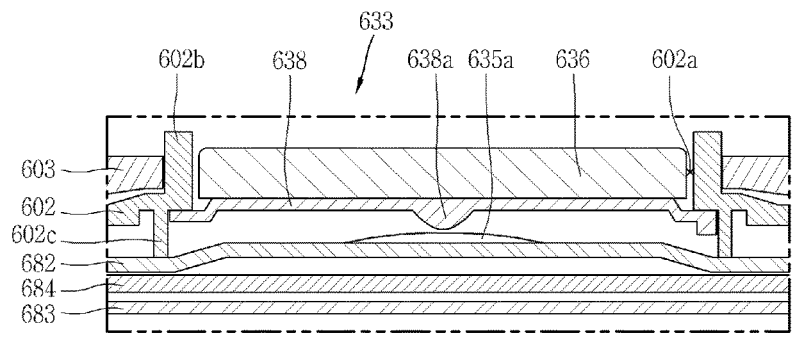
[Fig. 16]
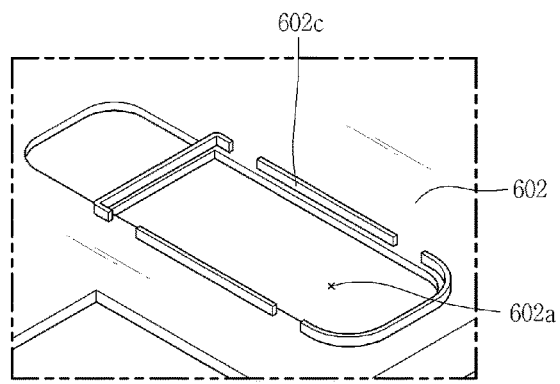

[Fig. 17]
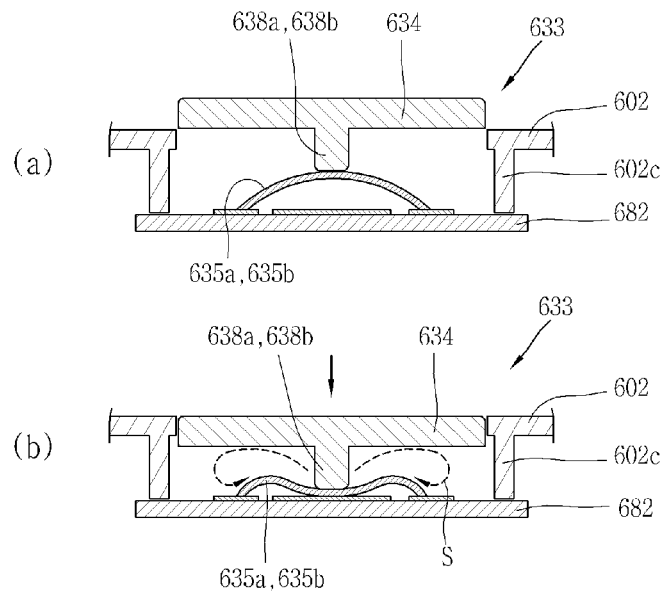
[Fig. 18]
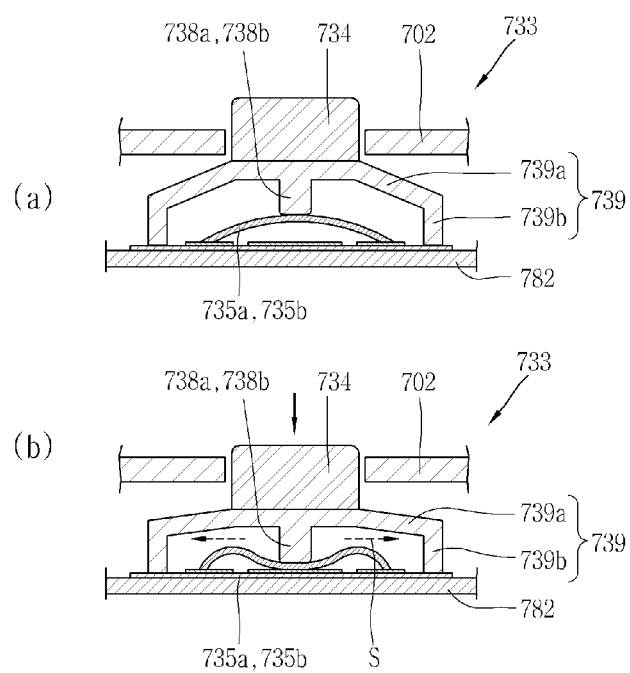

[Fig. 19]
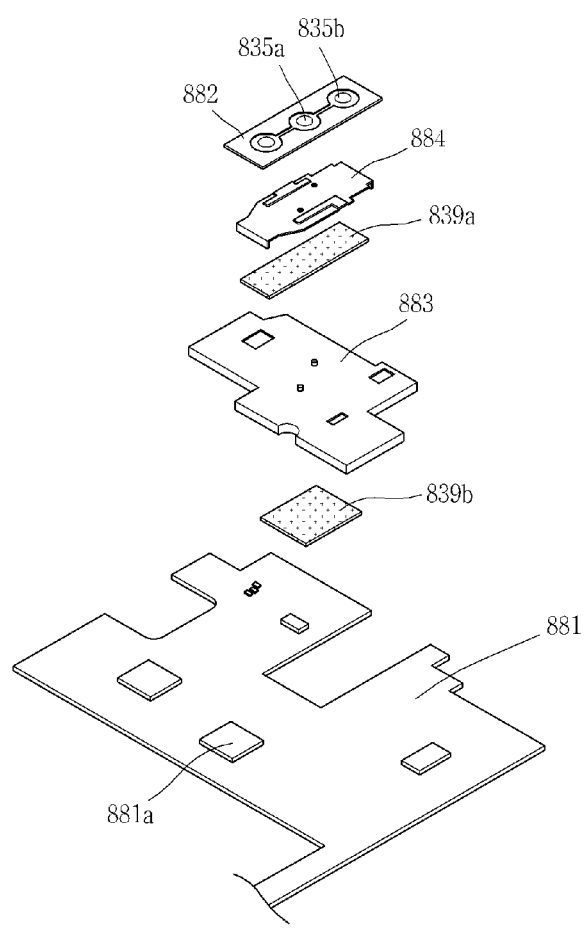

MOBILE TERMINAL

CROSS-REFERENCE TO RELATED APPLICATIONS

This application is the National Stage filing under 35 U.S.C. 371 of International Application No. PCT/KR2014/001127, filed on Feb. 11, 2014, which claims the benefit of earlier filing date and right of priority to Korean Application Nos. 10-2013-0079893, filed on Jul. 8, 2013, and 10-2013-0079894, filed on Jul. 8, 2013, the contents of which are all hereby incorporated by reference herein in their entirety.

TECHNICAL FIELD

The present disclosure relates to a mobile terminal, and particularly, to a mobile terminal having a user input unit for receiving a control command.

BACKGROUND ART

A mobile terminal is a device that can be carried around and has one or more functions such as to perform voice and video call communications, inputting and outputting information, storing data, and the like.

As functions of the terminal become more diversified, the terminal can support more complicated functions such as writing memos, receiving and transmitting e-mails and managing schedules. By comprehensively and collectively implementing such functions, the mobile terminal may be embodied in the form of a multimedia player or a device.

Various attempts have been made to implement complicated functions in such a multimedia device by means of hardware or software. As one example, a user interface for allowing a user to easily and conveniently search for or select a function is being provided.

As the mobile terminal is considered as a personal belonging to express a user's personality, various designs are required. The designs include structural changes and improvements for allowing a user to more conveniently use the mobile terminal. For such structural changes and improvements, a user input unit may be considered.

For instance, the user input unit may be implemented as a touch screen on a front surface of the mobile terminal, or may be implemented as an additional key so that a user's input can be received. However, the touch screen is disadvantageous in that an object to be manipulated is blocked by a user's finger or a stylus pen. In order to solve such problems, an additional key may be provided on a front surface or a side surface of a terminal body. However, in this case, there are limitations on a slim configuration, a simple design, etc. of the mobile terminal due to such additional key. Accordingly, a new type of user input unit capable of solving such problems may be considered.

DISCLOSURE OF INVENTION

Technical Problem

An aspect of the detailed description is to provide a mobile terminal capable of implementing a new type of user input differentiated from the conventional one.

Another aspect of the detailed description is to provide a mobile terminal capable of applying a new design onto a rear surface thereof.

Solution to Problem

To achieve these and other advantages and in accordance with the purpose of this specification, as embodied and broadly described herein, there is provided a mobile terminal, comprising: a terminal body having a front surface and a rear surface; a display unit disposed on the front surface, and configured to output visual information; and a rear input unit disposed on the rear surface, and configured to receive a control command by a push input, wherein the rear input unit includes: a button portion configured to be pressable as at least part thereof is exposed to outside via a through hole formed at a case of the terminal body; and a switch configured to generate a signal when pressed by a pressing operation of the button portion, wherein a press preventing unit, configured to prevent a force rather than a user's pressing operation from being applied to the button portion, is formed at the case so as to enclose at least part of the through hole by protruding more than the button portion.

According to an embodiment of the present invention, the press preventing unit may form a closed loop which completely encloses the button portion.

According to an embodiment of the present invention, the press preventing unit may be disposed to overlap the display unit in a thickness direction of the terminal body.

According to an embodiment of the present invention, the mobile terminal may further comprise a battery cover detachably coupled to the case, and having a through hole corresponding to the press preventing unit. The press preventing unit may be formed to be inserted into the through hole, and to protrude from the battery cover.

According to an embodiment of the present invention, the button portion may include a center key configured to receive a push input of a first function; and side keys disposed at two sides of the center key, and configured to receive a push input of a second function different from the first function.

The side keys may be provided with an accommodation hole for accommodating the center key therein.

The button portion may further include an elastic member coupled to the case to elastically-support the center key and the side keys, provided with actuators for pressing corresponding switches when the center key and the side key are pressed, and formed as a single member.

A cut-out portion configured to partition operation regions of the actuators from each other may be formed at the elastic member, such that one corresponding actuator is operated independently from another actuator when one of the center key and the side key is pressed. The cut-out portion may be formed to enclose at least part of the actuator corresponding to the center key.

According to an embodiment of the present invention, the mobile terminal may further comprise: a sub printed circuit board where the switches are mounted; a main printed circuit board electrically-connected to the sub printed circuit board, and providing a space where one or more electronic devices are mounted; a shield can installed at the main printed circuit board so as to cover at least one of the electronic devices; and a reinforcing member disposed to cover at least part of the shield can, and configured to support the sub printed circuit board by being supported by the main printed circuit board.

The mobile terminal may further comprise a rib protruding from an inner side surface of the case so as to support an external force transmitted to the press preventing unit, and supported by the reinforcing member. The rib may be formed in plurality, and may be formed at two sides of the through hole. Alternatively, the rib may be formed to enclose at least part of the through hole.

A bead configured to reinforce intensity of the reinforcing member may protrude from the reinforcing member. The bead may be formed to correspond to the rib for support of the rib.

A guide hole may be formed at the reinforcing member. A guide member to be inserted into the guide hole may be installed at the shield can, so as to guide mounting of the reinforcing member. The guide member may be configured as a rivet.

According to an embodiment of the present invention, the mobile terminal may further comprise: a rib protruding from an inner side surface of the case; and a frame having one surface where the display unit is mounted, and another surface from which a supporting portion protrudes to support the rib.

The rib may be formed in plurality, and may be formed at two sides of the through hole.

According to another aspect of the present invention, there is provided a mobile terminal, comprising: a terminal body having a front surface and a rear surface; a display unit disposed on the front surface, and configured to output visual information; and a rear input unit disposed on the rear surface, and configured to receive a control command by a pressing operation, wherein the rear input unit includes: a button portion exposed to outside from the rear surface, and configured to receive a push input; a switch configured to generate a signal when pressed by a push input of the button portion; and an operation sound shielding portion formed to enclose at least part of the switch, and configured to shield an operation sound generated when the switch is pressed.

According to an embodiment of the present invention, the operation sound shielding portion may be disposed to overlap the display unit in a thickness direction of the terminal body.

According to an embodiment of the present invention, the operation sound shielding portion may include a shielding pad installed at a printed circuit board where the switch is mounted, so as to enclose at least part of the switch, and configured to absorb or reflect the operation sound.

The shielding pad may be formed of an elastically-transformable porous material. Further, the shielding pad may be disposed so as to be spaced from the button portion by a prescribed distance, when the switch is in a pressed state by the button portion.

The operation sound shielding portion may further include a shielding rib protruding from a rear surface of the button portion, and disposed to overlap at least part of the shielding pad in a direction perpendicular to a switch pressing direction.

An actuator configured to press the switch may protrude from a rear surface of the button portion. The shielding rib may be formed to enclose at least part of the actuator. The shielding pad may be arranged to enclose the shielding rib.

The button portion may include: a key top exposed to outside partially or wholly via a through hole formed at a case of the terminal body; and an elastic member disposed on a rear surface of the key top, and having an actuator configured to press the switch when the key top is pressed. The shielding rib may protrude from a rear surface of the elastic member.

The shielding rib may protrude along an edge of the elastic member. The elastic member may be coupled to the case, and may be configured to elastically-support the key top when the key top is pressed.

The edge of the elastic member may be arranged to overlap the case in a thickness direction of the terminal body, such that the operation sound is prevented from leaking to the rear surface.

According to an embodiment of the present invention, the button portion may be formed to be pressable as at least part thereof is exposed to outside via the through hole formed at the case of the terminal body. The operation sound shielding portion may include a partition wall protruding from an inner side surface of the case, and formed to enclose at least part of the through hole.

The partition wall may be arranged to contact a printed circuit board where the switch is mounted.

According to an embodiment of the present invention, the operation sound shielding portion may include: a based coupled to a rear surface of the button portion, and provided with an actuator for pressing the switch when the button portion is pressed; and a bridge extending from the base to enclose at least part of the switch, supported by the printed circuit board where the switch is installed, and elastically-transformable when the switch is pressed by the button portion.

According to an embodiment of the present invention, the button portion may include: a center key configured to receive a push input of a first function; and side keys disposed at two sides of the center key, and configured to receive a push input of a second function different from the first function. The shielding pad may be formed to correspond to at least one of the center key and the side keys.

According to an embodiment of the present invention, the mobile terminal may further comprise: a sub printed circuit board where the switch is mounted; a main printed circuit board electrically-connected to the sub printed circuit board, and providing a space where one or more electronic devices are mounted; a shield can installed at the main printed circuit board so as to cover at least one of the electronic devices; and a reinforcing member disposed to cover at least part of the shield can, and configured to support the sub printed circuit board by being supported by the main printed circuit board.

A first vibration shielding portion, configured to absorb a vibration generated when the switch is pressed, so as to prevent transmission of the vibration to the shield can, may be provided between the reinforcing member and the shield can. A second vibration shielding portion, configured to absorb a vibration generated when the switch is pressed, so as to prevent transmission of the vibration to the shield can, may be provided between the shield can and the electronic device.

Advantageous Effects of Invention

The mobile terminal according to the present invention can have the following advantages.

Firstly, as the rear input unit is provided on the rear surface of the terminal body, a new type of user interface using the rear input unit can be implemented.

Secondly, in a case the conventional key is not provided on the front surface of the terminal body as the rear input unit disposed on the rear surface of the terminal body replaces the conventional key, the display unit on the front surface can have a larger screen.

Thirdly, application of a force rather than a user's pressing force to the button portion can be prevented by the press preventing unit.

Fourthly, the press preventing unit and the switch can be stably supported by various supporting structures.

Fifthly, an operation sound generated when the switch is pressed can be shielded by the operation sound shielding portion.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram of a mobile terminal according to an embodiment of the present invention;

FIG. 2A is a front perspective view of a mobile terminal according to an embodiment of the present invention;

FIG. 2B is a rear perspective view of the mobile terminal of FIG. 2A;

FIG. 3 is an exploded perspective view of the mobile terminal of FIG. 2B;

FIG. 4 is a detailed exploded view of the rear input unit in FIG. 3;

FIG. 5 is a cut-out view taken along line 'V-V' in FIG. 2B;

FIG. 6 is a sectional view of part 'B' in FIG. 5;

FIG. 7 is a view illustrating a rear surface of a rear case of FIG. 5;

FIG. 8 is a conceptual view illustrating a supporting structure of a reinforcing member of FIG. 3;

FIG. 9 is a conceptual view of a rear input unit according to another embodiment of the present invention;

FIG. 10 is a sectional view of a rear input unit according to still another embodiment of the present invention;

FIG. 11 is a conceptual view illustrating a mechanism for shielding an operation sound by an operation sound shielding portion of FIG. 10;

FIG. 12 is a sectional view of a rear input unit according to still another embodiment of the present invention;

FIG. 13 is a view illustrating a rear surface of an elastic member of FIG. 12;

FIG. 14 is a conceptual view illustrating a mechanism for shielding an operation sound by an operation sound shielding portion of FIG. 12;

FIG. 15 is a sectional view of a rear input unit according to still another embodiment of the present invention;

FIG. 16 is a view illustrating a rear surface of a rear case of FIG. 15;

FIG. 17 is a conceptual view illustrating a mechanism for shielding an operation sound by an operation sound shielding portion of FIG. 15;

FIG. 18 is a sectional view of a rear input unit according to still another embodiment of the present invention; and FIG. 19 is a conceptual view illustrating an example of a supporting structure of a rear input unit according to the present invention.

MODE FOR THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. A singular expression used in the present invention includes a plural meaning unless it is obviously defined. The suffixes attached to components, such as 'module' and 'unit or portion' were used for facilitation of the detailed description of the present invention. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), an E-book, a navigation system, etc.

FIG. 1 is a block diagram of a mobile terminal 100 according to one embodiment of the present disclosure.

The mobile terminal 100 may comprise components, such as a wireless communication unit 110, an Audio/Video (AN) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a
Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a prescribed part of the display unit 151, or a capacitance occurring from a prescribed part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

FIG. 2A is a front perspective view of a mobile terminal 200 according to an embodiment of the present invention, and FIG. 2B is a rear perspective view of the mobile terminal 200 of FIG. 2A.

The mobile terminal 200 according to the present invention is a bar type mobile terminal. However, the present invention is not limited to this, but may be applied to a slide type and a folder type in which two or more bodies are coupled to each other so as to perform a relative motion, a swing type, a swivel type, etc.

A case (casing, housing, cover, etc.) which forms an appearance of a terminal body may include a front case 201, a rear case 202 and a battery cover 203. Various components may be accommodated in a space formed by the front case 201 and the rear case 202. One or more frames 204 may be additionally disposed between the front case 201 and the rear case 202.

Such cases may be formed by injection-molded synthetic resin, or may be formed using a metallic material such as stainless steel (STS), titanium (Ti) and aluminum (Al).

A display unit 251, an audio output module 252, a proximity sensor 241, a camera module 221, etc. may be disposed on the terminal body, mainly on the front case 201. A microphone 222, a side input unit 232, an interface unit 270, etc. may be disposed on side surfaces of the front case 201 and the rear case 202.

The display unit 251 occupies most parts of a front surface of the front case 201. That is, the display unit 251 is disposed on the front surface of the terminal body, and is configured to output visual information. The audio output module 252, the proximity sensor 241 and the camera module 221 may be disposed at a region close to one end of the display unit 251, and a front input unit 231 may be disposed at a region close to another end of the display unit 251.

The front input unit 231, one example of the user input unit 130 (refer to FIG. 1) may include a plurality of manipulation units. The manipulation units may be referred to as manipulating portions, and may include any type of ones that can be manipulated in a user's tactile manner. In this embodiment, the front input unit 231 is configured as a touch key. However, the present invention is not limited to this. That is, a push key may be added to the front input unit 231.

The display unit 251 may implement a touch screen together with a touch sensor. In this case, the touch screen may serve as the user input unit 130. Under such configuration, the front surface of the mobile terminal may not be provided with the front input unit 231. In this case, an input to the terminal body of the mobile terminal 200 may be performed through the display unit 251 and a rear input unit 233 to be explained later.

The side input unit 232, an example of the user input unit 130 may be used to input a command such as controlling a size of an audio output from the audio output module 252, or a command such as converting the current mode of the display unit 251 into a touch recognition mode.

Referring to FIG. 2B, a camera module 221' may be additionally mounted to the rear surface of the terminal body, i.e., the rear case 202. The camera module 221' faces a direction which is opposite to a direction faced by the camera module 221 (refer to FIG. 2A), and may have pixels different from those of the camera module 221.

For example, the camera module 221 on the front surface may operate with relatively lower pixels (lower resolution). Thus, the camera module 221 may be useful when a user can capture his or her face and send it to a calling party in a video call mode or the like. On the other hand, the camera module 221' on the rear surface may operate with a relatively higher pixels (higher resolution) such that it can be useful for a user to obtain higher quality pictures for later use. The camera modules 221 and 221' may be installed at the terminal body so as to rotate or pop-up.

A flash 223 and a mirror (not shown) may be additionally disposed close to the camera module 221'. When capturing an object by using the camera module 221', the flash 223 provides light to the object. The mirror can cooperate with the camera module 221' to allow a user to photograph himself or herself in a self-portrait mode.

An audio output unit 252' may be additionally disposed on the rear surface of the terminal body. The audio output module 252' on the rear surface may implement a stereo function together with the audio output module 252 on the front surface (refer to FIG. 2A), and may be used for calling in a speaker phone mode.

A battery 291 for supplying power to the mobile terminal 200 is mounted to the terminal body. The battery 291 is implemented as an example of the power supply unit 190. The battery 291 may be mounted in the terminal body, or detachably mounted to the terminal body.

The rear input unit 233 is disposed on the rear surface of the terminal body. The rear input unit 233 may be positioned close to the camera module 221'.

The rear input unit 233 may be set to input commands for controlling the mobile terminal 200 in various manners. For instance, the rear input unit 233 may be configured to input commands such as POWER ON/OFF, START, END and SCROLL, or a command such as controlling a volume of a sound outputted from the audio output units 252 and 252', or a command such as converting a mode of the display unit 251 into a touch recognition mode.

The rear input unit 233 is implemented so as to receive a push input. Hereinafter, a configuration of the rear input unit 233 will be explained in more detail.

FIG. 3 is an exploded perspective view of the mobile terminal 200 of FIG. 2B.

Referring to FIG. 3, printed circuit boards (PCBs) 281 and 282 are mounted in the terminal body. The PCBs 281 and 282 may be mounted to the front case 201 or the rear case 202, or an additional structure. The additional structure may be a frame 204. A structure, where the front case 201 and the rear case 202 are separately provided from each other, will be explained hereinafter. However, the present invention is not limited to this. That is, the front case 201 and the rear case 202 may be integrally formed with each other.

The PCBs 281 and 282 are configured as an example of the controller 180 (refer to FIG. 1) for operating various functions of the mobile terminal 200. Various types of electronic devices are mounted to the PCBs so that the PCBs can serve as the controller 180. The PCB may be provided in plurality, and may serve as the controller 180 as the plurality of PCBs are combined with each other. In drawings, the PCB is provided with a main PCB 281 and a sub PCB 282 electrically-connected to each other. The main PCB 281 and the sub PCB 282 are arranged so that at least part thereof can be overlapped with each other in a thickness direction of the terminal body.

A battery accommodation unit 292 for accommodating the battery 291 therein is formed at the rear case 202. The battery cover 203 is detachably coupled to the rear case 202 so as to cover the battery accommodation unit 292. Unlike the above detachable structure, the battery 291 may be mounted in the terminal body in a fixed manner.

The camera module 221' is electrically connected to the PCBs 281 and 282, and is disposed on the rear surface of the mobile terminal so as to capture an external image on the rear surface. An image window 221a' is configured to protect the camera module 221' in a covering manner. As shown, the image window 221a' may be mounted to the rear case 202, and may be exposed to outside via a through hole 203a of the battery cover 203.

The rear input unit 233 configured to receive a control command is provided on the rear surface of the terminal body. Through holes 202a and 203a corresponding to the rear input unit 233 are formed at the rear case 202 and the battery cover 203, respectively. The rear input unit 233 is exposed to the rear surface via the through holes 202a and 203a, and is configured so as to be manipulated.

The rear input unit 233 may be disposed so as to overlap the display unit 251 which is on the front surface, in a thickness direction of the terminal body. For instance, the rear input unit 233 may be disposed at an upper end of the rear surface of the terminal body, so that a user who is holding the terminal body in his one hand can easily manipulate the mobile terminal using his index finger. However, the present invention is not limited to this. That is, the position of the rear input unit 233 may be variable.

As the rear input unit 233 is provided on the rear surface of the terminal body, a new type of user interface using the rear input unit 233 may be implemented. Furthermore, in a case the front input unit 231 is not provided on the front surface of the terminal body as the rear input unit 233 replaces one or more functions of the front input unit 231, the display unit 251 on the front surface can have a larger screen.

Hereinafter, a detailed structure of the rear input unit 233 will be explained in more detail.

FIG. 4 is a detailed exploded view of part the rear input unit in FIG. 3.

Referring to FIGS. 3 and 4, the rear input unit 233 includes a button portion 234 and switches 235a, 235b.

The button portion 234 is configured to be pressable as at least part thereof is exposed to outside via a through hole 202a of the rear case 202. The button portion 234 may be configured to be pressable in a thickness direction of the terminal body, i.e., in a direction toward the display unit 251 formed on the front surface.

The button portion 234 may be disposed close to the camera module 221'. As shown in FIG. 3, the camera module 221' and the button portion 234 may be disposed in the through hole 203a formed at the battery cover 203 in the form of a slot. Under such configuration, the rear surface of the terminal body can have an integrated appearance. As a result, the rear surface of the terminal body can have a more sophisticated design.

The switches 235a and 235b are configured to generate a signal when pressed by the button portion 234. In drawings, the switches 235a and 235b corresponding to a center key 236 and side keys 237, respectively are installed at the sub PCB 282.

The button portion 234 includes the center key 236 and the side keys 237 each formed of a rigid material. The center key 236 is configured to receive a push input of a first function. For instance, the first function may be a function related to power ON/OFF or activation of the display unit 251. In this case, the center key 236 may be a power key of the mobile terminal 200.

The side keys 237 are disposed at two sides of the center key 236, and are configured to receive a push input of a second function different from the first function. The side keys 237 disposed at two sides of the center key 236 may be configured to generate a different control command. For instance, the second function may be a function related to controlling a size of a sound output from the mobile terminal 200.

The side key 237 may be provided with a through hole 237a for accommodating the center key 236, and may be configured to completely enclose an outer circumference of the center key 236. The center key 236 may be formed to protrude more than the side keys 237. At least part of the side keys 237 may be inclined in a protruding direction toward the center key 26, so that the center key 236 and the side keys 237 can be smoothly connected to each other at an interface therebetween. Under such configuration, a user can recognize a manipulation position of the button portion 234 in a tactile manner.

An elastic member 238 is mounted to a rear surface of the center key 236 and the side keys 237. Actuators 238a and 238b (refer to 538a and 538b in FIG. 13, another embodiment), configured to press switches 235a and 235b which correspond to the center key 236 and the side keys 237, are formed at the elastic member 238 in a protruding manner. As shown, the elastic member 238 may be implemented as a single member which covers the rear surface of the center key 236 and the side keys 237. A coupling portion 238d is coupled to a rear surface of the rear case 202, so as to elastically-support the center key 236 and the side keys 237.

A cut-out portion 238c, configured to partition operation regions of the actuators 238a and 238b from each other, is formed at the elastic member 238, such that one corresponding actuator is operated independently from another actuator when one of the center key 236 and the side key 237 is pressed. In drawings, the cut-out portion 238c is formed to enclose at least part of the actuator 238a corresponding to the center key 236.

The button portion 234 may be operated against a user's intention, because it is provided on the rear surface of the terminal body. For instance, if a user locates the mobile terminal 200 on the floor for use, in a state where the display unit 251 on the front surface is toward the upper side, the button portion 234 may be pressed by a force. The present invention provides a structure to prevent an unintentional operation of the button portion 234 and damage of the button portion 234, due to such reacting force. Hereinafter, such structure will be explained in more detail.

FIG. 5 is a cut-out view of the mobile terminal 200 of FIG. 2, which is taken along line 'V-V'. FIG. 6 is a sectional view of part 'B' in FIG. 5, Referring to FIGS. 5 and 6, a press preventing unit 202b, configured to prevent a force rather than a user's pressing operation from being applied to the button portion 234, is formed at the rear case 202 so as to enclose at least part of the through hole 202a by protruding more than the button portion 234. Under such configuration, the button portion 234 is not pressed even in a case where the rear surface of the mobile terminal 200 contacts the floor, because the button portion 234 is disposed at an inner side of the press preventing unit 202b. The press preventing unit 202b may be disposed to overlap the display unit 251 in a thickness direction of the terminal body.

FIG. 4 illustrates that the press preventing unit 202b is formed to completely enclose the button portion 234 for a closed loop. In this embodiment, the center key 236 is accommodated in the side keys 237. Accordingly, the press preventing unit 202b protrudes from a bottom surface of the rear case 202 so as to cover an outer circumferential surface of the side keys 237, and extends along an outer circumference of the side keys 237.

The battery cover 203 for covering the battery 291 is detachably coupled to the rear case 202. The battery cover 203 is provided with a through hole 203a corresponding to the press preventing unit 202b. The through hole 203a has a larger size than the through hole 202a of the rear case 202. The press preventing unit 202b may be configured to be inserted into the through hole 203a to thus protrude from the battery cover 203, when the battery cover 203 is coupled to the rear case 202.

As the button portion 234 is configured to be pressable, a structure for supporting a force applied to the button portion 234 is required. Further, a structure for supporting a reacting force applied to the press preventing unit 202b is also required. Hereinafter, a structure for supporting the button portion 234 and the press preventing unit 202b will be explained in more detail.

FIG. 7 is a view illustrating a rear surface of the rear case 202 of FIG. 5, and FIG. 8 is a conceptual view illustrating a supporting structure of a reinforcing member 284 of FIG. 3.

Referring to FIGS. 7 and 8 with FIGS. 3 to 6, the center key 236 is illuminated. The switch 235a pressed by a pressing operation of the button portion 234, and optical sources 233a for irradiating light to the switch 235a are installed at the sub PCB 282. Light irradiated from the optical sources 233a is guided to the switch 235a by an optical guide film 233b, thereby being used to illuminate the center key 236 disposed on the switch 235a.

The optical sources 233a may be disposed at two sides of the switch 235a. Empty spaces 282, which are recessed from one side of the sub PCB 282 toward another side, may be formed between the optical sources 233a and the switch 235a. The empty spaces 282a may be formed as a plurality of substrates are connected to each other at another side of the sub PCB 282.

The optical guide film 233b may be disposed to pass through the empty space 282a. The optical guide film 233b may be fixed by a protrusion 282b provided on the sub PCB 282. Preferably, the optical guide film 233b is formed at a region rather than the switch 235a, so that the actuator 238a can directly press the switch 235a. That is, the optical guide film 233b is formed to enclose an outer circumference of the switch 235a.

The main PCB 281 is electrically-connected to the sub PCB 282, and is provided with a space where an electronic device 281a is mounted. A shield can 283 is installed on the main PCB 281, so as to overlap the switches 235a and 235b in a thickness direction of the terminal body. The shield can 283 is disposed to cover at least one electronic device 281a, for shield of EMI. The shield can 283 is configured to support the switches 235a and 235b when the button portion 234 is pressed.

A reinforcing member 284 supported by the main PCB 281 is installed on the shield can 283, thereby supporting the sub PCB 282. The reinforcing member 284 may be formed of a metallic material of high intensity (e. g, stainless steel) or a composite material. Bending portions 284a are provided at two sides of the reinforcing member 284, and are supported by the main PCB 281. The bending portions 284a may be disposed to cover side walls of the shield can 283. Under such configuration, the reinforcing member 284 supports the switches 235a and 235b together with the shield can 283, when the button portion 234 is pressed. Accordingly, a more stable supporting structure can be implemented.

Ribs 202c are formed to protrude from an inner side surface of the rear case 202, which are supported by the reinforcing member 284. As shown, the ribs 202c may be provided at two sides of the through hole 202a. The ribs 202c may be formed to enclose at least part of the through hole 202a. Under such connection structure to the reinforcing member 284 from the press preventing unit 202b via the ribs 202c, an external force transferred to the press preventing unit 202b can be supported.

Beads 284b, configured to reinforce intensity of the reinforcing member 284, are penetratingly-formed at the reinforcing member 284 by a press process. A shape and a position of the bead 284b may be modified in various manners. As shown, two beads 284b may be formed at two sides of the reinforcing member 284 in correspondence to the ribs 202c, for support of the ribs 202c. The bead 284b may be formed so that at least part thereof can be bent.

Referring to FIGS. 5 and 6, the beads 284b are configured to support the ribs 202 by being inserted into the empty spaces 282a of the sub PCB 282. The optical guide film 233b may be disposed between the beads 284b and the ribs 202c.

A guide hole 284c is formed at the reinforcing member 284. A guide member 283a to be inserted into the guide hole 284c is installed at the shield can 283, thereby guiding mounting of the reinforcing member 284. The guide member 283a may protrude from the shield can 283 in the form of a boss. Further, the guide member 283a may be configured to couple the shield can 283 and the reinforcing member 284 to each other. The guide member 283a may be implemented as a rivet.

FIG. 9 is a conceptual view of a rear input unit 333 according to another embodiment of the present invention.

Referring to FIG. 9, ribs 302c are formed to protrude from an inner side surface of a rear case 302. As shown, two ribs 302c may be formed at two sides of a through hole 302a.

A front case 301 and a main PCB 381 are disposed on a front surface and a rear surface of a frame 304. A supporting portion 304a protrudes from the rear surface of the frame 304, thereby supporting the ribs 302c. The supporting portion 304a may be provided in plurality in correspondence to the ribs 302c, and may be formed at two sides of switches 335a and 335b.

Under such connection structure to the supporting portions 304a from a press preventing unit 302b via the ribs 302c, an external force transferred to the press preventing unit 302b can be supported.

While the switches 335a and 335b are pressed, an operation sound is generated. Such operation sound is transmitted to inside or outside of the terminal body. The operation sound is rapidly transmitted to a user's ear, because a distance between the rear input unit and the audio output module on the front surface where the user's ear is positioned is short. The present invention provides a structure for shielding such operation sound. Hereinafter, such structure will be explained in more detail.

FIG. 10 is a sectional view of a rear input unit 433 according to still another embodiment of the present invention, and FIG. 11 is a conceptual view illustrating a mechanism for shielding an operation sound (S) by an operation sound shielding portion 439 of FIG. 10.

Referring to FIGS. 10 and 11, the operation sound shielding portion 439 is configured to shield an operation sound (S) generated when switches 435a and 435b are pressed, by enclosing at least part of the switches 435a and 435b. That is, the operation sound shielding operation 439 prevents transfer of the operation sound (S) to the front surface of the terminal body via a display unit 451.

The operation sound shielding portion 439 includes a shielding pad 439a installed at a printed circuit board so as to enclose the switches 435a and 435b mounted on the printed circuit board, and the shielding pad 439a configured to absorb or reflect the operation sound (S). The shielding pad 439a may be formed of a porous material which can be elastically-transformed. For instance, the shielding pad 439a may be urethane foam.

According to experiments, the shielding pad 439a preferably has a compression ratio of 60%. If the shielding pad 439a has a compression ratio more than 60%, a shielding effect may be degraded. On the contrary, if the compression ratio is less than 60%, a user's click feeling may be degraded when the shielding pad 439a contacts the button portion 434.

The shielding pad 439a may be disposed in a thickness direction of the terminal body, so as to overlap the display unit 451. As shown, the shielding pad 439a may be disposed to overlap the button portion 434 as well as the display unit 451.

The shielding pad 439a is preferably spaced from the button portion 434 by a prescribed interval in a state where the switches 435a and 435b have been pressed by the button portion 434, so that a user can press the button portion 434 with enhanced click feeling. According to experiments, the interval may be 0.15 mm. That is, a thickness of the shielding pad 439a may be calculated by deducting a moving distance of the button portion 434, and the interval for preventing degradation of a user's click feeling, from a distance between the button portion 434 and a sub PCB 482.

A shielding mechanism will be explained in more detail.

Once the switches 435a and 435b are pressed by actuators 438a and 438b as the button portion 434 is pressed by a user, an operation sound (S) is generated to spread. The shielding pad 439a is arranged to block the operation sound (S) from leaking to side surfaces of the switches 435a and 435b, and is configured to absorb or reflect the operation sound (S). Under such configuration, the operation sound (S) may be shielded.

An edge part of an elastic member 438 may be disposed to overlap a rear case 402 in a thickness direction of the terminal body, so that the operation sound (S) can be prevented from being transferred to the rear surface of the terminal body. In drawings, the edge part of the elastic member 438 is disposed to cover a rear surface of the rear case 402. As aforementioned, a coupling portion 438d of the elastic member 438 is coupled to a rear surface of the rear case 402, and is configured to elastically-support a key top such as a center key 436 or side keys 437 when the key top is pressed.

FIG. 12 is a sectional view of a rear input unit 533 according to still another embodiment of the present invention, FIG. 13 is a view illustrating a rear surface of an elastic member 538 of FIG. 12, and FIG. 14 is a conceptual view illustrating a mechanism for shielding an operation sound (S) by an operation sound shielding portion 539 of FIG. 12.

Referring to FIGS. 12 to 14, the operation sound shielding portion 539 further includes a shielding rib 539b a shielding pad 539a. The shielding rib 539b protrudes from a rear surface of the button portion 534, and is disposed to partially or wholly overlap the shielding pad 539a in a direction perpendicular to a pressing direction of switches 535a and 535b. Under such configuration, the interval implemented for prevention of lowering of a user's click feeling in the aforementioned structure can be removed. This can allow the mobile terminal to have a more closed structure and a more enhanced shielding characteristic.

The shielding rib 539b is formed to enclose at least part of actuators 538a and 538b. The shielding rib 539b may be formed to protrude from a rear surface of the elastic member 538. In drawings, the shielding rib 539b protrudes along an edge part of a rear surface of the elastic member 538 for a closed loop, and the shielding pad 539a is disposed to enclose the shielding rib 539b. In this case, the shielding pad 539a serves to guide motion of the elastic member 538 when the button portion 534 is pressed. Alternatively, the shielding rib 539b may be formed to enclose the shielding pad 539a.

FIG. 15 is a sectional view of a rear input unit 633 according to still another embodiment of the present invention, FIG. 16 is a view illustrating a rear surface of a rear case 602 of FIG. 15, and FIG. 17 is a conceptual view illustrating a mechanism for shielding an operation sound (S) by an operation sound shielding portion 639 of FIG. 15.

Referring to FIGS. 15 to 17, the operation sound shielding portion 639 is provided with a partition wall 602c protruding from an inner side surface of the rear case 602, and the partition wall 602c formed to enclose at least part of a through hole 602a. The partition wall 602c is arranged to block an operation sound (S) from leaking to side surfaces of switches 635a and 635b, and is configured to absorb or reflect the operation sound (S). That is, the operation sound (S) can be shielded through a structural modification of the rear case 602, without requiring a shielding pad 639a.

As shown in FIG. 16, the partition wall 602c may be formed at the rear case 602 at a region rather than a coupling portion 638d of an elastic member 638 coupled to the rear case 602. The partition wall 602c may be disposed so as to contact a printed circuit board (PCB) where the switches 635a and 635b are mounted, or to contact an optical guide film (not shown) arranged on the PCB.

FIG. 18 is a sectional view of a rear input unit 733 according to still another embodiment of the present invention.

Referring to FIG. 18, an operation sound shielding portion 739 is configured to support a key top such as a center key 736 or side keys 737, such that the key top is arranged on switches 735a and 735b. The operation sound shielding portion 739 is further configured to press the switches 735a and 735b by being elastically-transformed when the key top is pressed.

The operation sound shielding portion 739 includes a base 739a and a bridge 739b. The base 739a and the bridge 739b may be formed of an elastically-transformable material, and may be integrally formed with each other.

More specifically, the base 739a is coupled to a rear surface of the button portion 734, and is provided with actuators 738a and 738b configured to press the switches 735a and 735b when the button portion 734 is pressed. The bridge 739b is formed to enclose the switches 735a and 735b by extending from the base 739a. The bridge 739b is formed to be supported by a sub PCB 782 where the switches 735a and 735b are installed, and to be elastically-transformable when the button portion 734 is pressed.

Under such configuration, the switches 735a and 735b are completely covered by the operation sound shielding portion 739. Accordingly, an operation sound (S) generated when the switches 735a and 735b are pressed can be blocked by the bridge 739b.

FIG. 19 is a conceptual view illustrating an example of a supporting structure of a rear input unit 833 according to the present invention.

Referring to FIG. 19, an operation sound (S) generated when switches 835a and 835b are pressed may be transmitted in the form of vibration as well as sound. A sub PCB 882 where the switches 835a and 835b are installed is supported by a reinforcing member 884 and a shield can 883 disposed to overlap each other, in a thickness direction of a terminal body. This means that vibration generated when the switches 835a and 835b are pressed is transferrable to a front surface of the terminal body, through the reinforcing member 884 and the shield can 883.

To prevent this, a first vibration shielding portion 839a configured to absorb vibration is disposed between the reinforcing member 884 and the shield can 883. The first vibration shielding portion 839a is formed of an elastically-transformable material (e.g., urethane film), and is configured to prevent transfer of vibration between the reinforcing member 884 and the shield can 883. Accordingly, occurrence of noise due to vibration can be prevented.

A second vibration shielding portion 839b configured to absorb vibration is disposed between the shield can 883 and an electronic device covered by the shield can 883. The second vibration shielding portion 839b is formed of an elastically-transformable material (e.g., urethane foam), and is configured to prevent transfer of vibration between the shield can 883 and an electronic device. The second vibration shielding portion 839b is further configured to prevent resonance of the shield can 883.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal, comprising:
a terminal body having a front surface and a rear surface;
a display unit disposed on the front surface and configured to output visual information;
a rear input unit disposed on the rear surface and configured to receive a control command by a push input,
wherein the rear input unit includes:
a button portion configured to be pressable as at least part of the button portion is exposed to outside via a through hole formed at a case of the terminal body;
a switch configured to generate a signal when pressed by a pressing operation of the button portion; and
a press preventing unit configured to prevent a force other than a user's pressing operation from being applied to the button portion, wherein the press preventing unit is formed at the case so as to enclose at least part of the through hole by protruding more than the button portion, and
wherein the button portion includes:
a center key configured to receive a push input of a first function; and side keys disposed at two sides of the center key,
side keys having an accommodation hole for accommodating the center key therein, wherein the side keys are configured to receive a push input of a second function different from the first function;
an elastic member coupled to the case to elastically-support the center key and the side keys, provided with actuators for pressing corresponding switches when the center key and the side key are pressed, and formed as a single member;
a main printed circuit board providing a space where one or more electronic devices are mounted;
a shield-can installed at a portion of the main printed circuit board so as to cover at least one of the electronic devices;
a reinforcing member disposed on at least part of the shield-can; and
a sub printed circuit board where the switches are mounted and electrically-connected to the main printed circuit board, wherein the sub printed circuit board is disposed on a portion of the reinforcing member,
wherein a cut-out portion configured to partition operation regions of the actuators from each other is formed at the elastic member, the cut-out portion enclosing at least one part of the actuators corresponding to the center key such that one corresponding actuator is independently operated from another actuator when one of the center key and the side key is pressed.

2. The mobile terminal of claim 1, wherein the press preventing unit forms a closed loop which completely encloses the button portion.

3. The mobile terminal of claim 1, wherein the press preventing unit is disposed to overlap the display unit in a thickness direction of the terminal body.

4. The mobile terminal of claim 1, further comprising a battery cover detachably coupled to the case, and having a through hole corresponding to the press preventing unit, wherein the press preventing unit is formed to be inserted into the through hole, and to protrude from the battery cover.

5. A mobile terminal, comprising:

a terminal body having a front surface and a rear surface;

a display unit disposed on the front surface and configured to output visual information;

a rear input unit disposed on the rear surface and configured to receive a control command, wherein the rear input unit includes a button portion, and wherein at least part of the button portion is exposed to outside via a through hole formed at a case of the terminal body;

a main printed circuit board providing a space where one or more electronic devices are mounted;

a shield-can installed at a portion of the main printed circuit board so as to cover at least one of the electronic devices;

a reinforcing member disposed on at least part of the shield-can; and a sub printed circuit board electrically-connected to the main printed circuit board and disposed on a portion of the reinforcing member, wherein the sub printed circuit board includes an extending portion extending to outside of the reinforcing member, and wherein the at least part of the shield-can, the portion of the reinforcing member, and the sub printed circuit board overlap, wherein the mobile terminal further comprises:

a press preventing unit configured to prevent a force other than a user's pressing operation from being applied to the button portion, wherein the press preventing unit is formed at the case so as to enclose at least part of the through hole by protruding more than the button portion; and a rib protruding from an inner side surface of the case so as to support an external force transmitted to the press preventing unit, wherein the rib is supported by the reinforcing member, wherein the rib is formed in plurality, and the plurality of ribs are formed at two sides of the through hole to surround the through hole.

6. The mobile terminal of claim 5, wherein a bead configured to reinforce intensity of the reinforcing member protrudes from the reinforcing member.

7. The mobile terminal of claim 6, wherein the bead is formed to correspond to the rib for support of the rib.

8. The mobile terminal of claim 5, wherein a guide hole is formed at the reinforcing member, and wherein a guide member to be inserted into the guide hole is installed at the shield-can so as to guide mounting of the reinforcing member.

\* \* \* \* \*